3,098,010
PROCESS FOR INCREASING THE EFFECTS OF MONOAMINE OXIDASE INHIBITORS BY MEANS OF CATECHOL-O-METHYL TRANSFERASE
Guy M. Everett, Chicago, and Arthur A. Wykes, Deerfield, Ill., assignors to Abbott Laboratories, North Chicago, Ill., a corporation of Illinois
No Drawing. Filed Oct. 5, 1961, Ser. No. 143,054
7 Claims. (Cl. 167—65)

This invention relates to methods and pharmaceutical compositions for inhibiting the action of enzyme systems which contribute to the destruction and rapid metabolization of brain and other catechol amines in warm-blooded animals.

It has been demonstrated that the enzyme system known as monoamine oxidase contributes to the rapid destruction in vivo of β-3,4-dihydroxyphenylalanine (DOPA), serotonin, epinephrine, norepinephrine and other catechol amines. There is evidence that the presence of these substances is important to the well-being and maintenance of normal temperament of warm-blooded animals.

Although the inhibition of monoamine oxidase (hereinafter referred to as MAO) produces an increase in activity and aggressiveness of animals, it is believed that other metabolic pathways may also contribute to the rapid inactivation or destruction of catechol amines.

An important object of this invention is to provide methods and compositions for inhibiting the activity of selected enzyme systems in ways which effectively potentiate monoamine oxidase inhibition.

The present invention is based on the discovery that by combining monoamine oxidase inhibitors with a compound exhibiting O-methyl transferase (OMT)—sometimes called catechol-O-methyl transferase—enzyme inhibitory action, anti-depressant physiological responses greatly in excess of those realized from administration of a monoamine oxidase inhibitor alone is achieved. This response is all the more unpredictable because compounds exhibiting OMT inhibition when administered alone, that is in the absence of a MAO inhibitor, have little or no effect on animal behavior or related physiological responses.

The OMT inhibitory component of this invention inhibits the metabolism of catechol amines to methylated amines. As an example of this, OMT inhibitors impede the formation of metanephrine from epinephrine, and the formation of normetanephrine from norepinephrine. The compositions and methods of this invention provide a means for alleviating the distressing symptoms of depression.

It has been found that the effects of therapeutic doses of compounds inhibiting the activity of MAO are dramatically potentiated when administered in conjunction with enzyme inhibiting levels of OMT inhibitors.

The MAO inhibitory component of this invention may be any of several recognized types of compounds such as α-methylphenethylhydrazine, isonicotinic acid 2-isopropylhydrazide, 1-benzyl-2(5-methyl-3-isoxazolylcarbonyl) hydrazine, etryptamine, β-phenylethylhydrazine and N-isonicotinoyl - N' - [β - (N - benzylcarboxamido)ethyl] hydrazine. It is preferred that N-propargylbenzylamine, and compounds related thereto, and their non-toxic pharmaceutically acceptable salts, be used as the first component of the therapeutic compositions and methods. Illustrative preferred MAO inhibitors are those having the general formula:

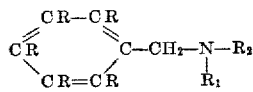

wherein R is hydrogen, chlorine, bromine or fluorine; $R_1$ is hydrogen, methyl or ethoxycarbonyl; and $R_2$ is propargyl or cyclopropyl; provided that when any R represents halogen, two halogen atoms are present on the phenyl group. These preferred compounds and methods for their preparation are described in the following U.S. patent applications: Serial No. 79,173, filed December 29, 1960; Serial No. 847,908, filed October 22, 1959, both now abandoned; and Serial No. 54,852, filed September 9, 1960.

The incorporation of N-methyl-N-benzylpropargylamine, N-propargylbenzylamine, N-propargyl-α-phenylethylamine and their pharmaceutically acceptable non-toxic acid addition salts with an OMT inhibitor in suitable dosage unit form is especially advantageous.

As the second essential component of the compositions an effective level of OMT inhibitor or inhibitors is combined with at least one MAO inhibitor. Several classes of compounds may be employed in the compositions to utilize their OMT inhibitory effects, but the following are preferred because of their high activity at lower dosage levels: acridines, isoquinolines, quinolines, piperazines and homopiperazines. Also certain diamines, especially ethylene diamine, display OMT inhibition and are excellent MAO inhibition potentiators in vivo. Other classes of compounds displaying OMT inhibition may be used but their inclusion is ordinarily not preferred because of the necessity of employing higher dosage levels. These compounds which are useful but require higher dosages include the following: pyridines, phenoxazines and naphthoquinones.

Specific compounds and closely related groups of compounds which may be incorporated into the preparations at lower dosage levels as MAO inhibition potentiators include the following: quinacrine, aminoalkylamino acridines, methapyrilene, tripelennamine, 2[2-(α-pyridine ethyl)2-thenylamino]pyridine, 2[2-(α-pyridine ethyl)2-thenylamino] piperazine, 4-amino-6-dimethylamino-2-methylquinoline, N,N'-di-2-pyridine homopiperazine and 1-methyl-6,7-dimethoxy-3,4-dihydroisoquinoline.

Optimum dosages of OMT inhibitors vary between species and individuals, with some dependency upon the MAO component of the combination and the route of administration. Illustrative effective dosage levels of some preferred OMT inhibitors are given using N-methyl-N-benzylpropargylamine in mice at an oral dosage level of 50 mg./kg. When administered in conjunction with an oral dose of about 50 mg./kg. of N-methyl-N-benzylpropargylamine the following levels of OMT inhibitors may be administered to give marked anti-depressant activity: 2[2-(α-pyridine ethyl)2-thenylamine]piperazine, intraperitoneally 1 to 20 mg./kg.; N,N'-di-2-pyridine homopiperazine, 25 mg./kg. I.P.; 4-amino-6-dimethylamino-2-methylquinoline, 25 mg./kg. I.P., 50 mg./kg. oral; quinacrine, 25 to 200 mg./kg. oral, and 10 to 100 mg./kg. I.P.

One method for preparing O-methyl transferase enzyme material for use in screening compounds as potential in vivo OMT inhibitors is that of Wykes, Taylor and Lewis reported in Federation Proceedings, vol. 20, No. 1, March 1961 (Part 1), which method is a modification of that of Axelrod and Tomchick, J. Bio. Chem. 233:702 (1958).

The following detailed examples will serve to further illustrate the invention.

*Example I*

The following procedure is used to obtain potentiation of a potent monoamine oxidase inhibitor, N-methyl-N-benzylpropargylamine. The procedure employed is based upon the phenomenon that in a normal mouse a dosage of 200 mg. of β-3,4-dihydroxyphenylalanine (DOPA) per kg. of body weight produces only piloerection and no remarkable central action, due to the rapid destruction of DOPA and other catechol amines by monoamine oxidase. If this enzyme is inhibited these substances are only slowly destroyed and centrally accumulate to produce a marked increase in excitement, running activity, squealing and jumping in treated mice.

An oral dose of 50 mg./kg. of N-methyl-N-benzylpropargylamine (0.5% solution) is given 4 hours prior to the intraperitoneal administration of a 1% aqueous saline suspension of DOPA. The control group so treated gives a 1+DOPA response, the graded responses being given below.

In the test group 50 mg./kg. of N-methyl-N-benzylpropargylamine is given and 3 hours later a test drug is administered. The level of test drug chosen has no behavioral effect of itself in the mice. At the fourth hour after N-methyl-N-benzylpropargylamine administration the DOPA is given and the behavioral reaction is assessed. Responses are graded as follows:

0—No effect observed compared to normal mice or mice given DOPA alone.
1—Minimal response. The mice show some effect, generally piloerection, and/or erect tail, and increased rate of respiration.
2—Intensification of response 1. Shaking the cage causes great activity.
3—Spontaneous jumping. Mice are very active and irritable.

Using quinacrine the following response is observed:

| Route of Admn. | Dose, mg./kg. | Response | | | |
|---|---|---|---|---|---|
| | | 1 hr. | 4 hr. | 24 hr. | 48 hr. |
| I.P | 5 | 1 | | | |
| I.P | 10 | 2 | | | |
| I.P | 20 | 2 | | | |
| I.P | 25 | 3 | 3− | 3− | |
| I.P | 30 | 3 | | | |
| I.P | 50 | 3 | 3− | 3− | |
| I.P | 100 | 3 | | | |
| Oral | 25 | 1 | | | |
| Oral | 50 | 1 | | | |
| Oral | 100 | 3− | | | |
| Oral | 200 | 3− | 3− | 2 | 1 |

*Example II*

Semi-purified O-methyl transferase enzyme, useful in screening compounds as potential OMT inhibitors may be prepared in the following manner. This method was adopted from a procedure described by Axelrod and Tomchick, J. Bio. Chem. 233:702 (1958).

Adult, male Holtzman rats are decapitated, exsanguinated and the livers removed. Immediately after removal the liver tissue is freed of connective tissue, washed with cold deionized water and chilled to 0° C. All steps in the isolation are done near 0° C. The livers are cut into small pieces and passed through a chilled tissue press having 1 mm. holes. Ninety to 95 gm. of the resulting liver paste are weighed out and slurried with cold 0.9% KCl. The slurry is homogenized in a Potter-Elvehjem homogenizer using 2–3 strokes or passes. The finished chilled homogenate is diluted 1 gm. to 4 ml. based upon the wet weight of the liver paste, using 0.9% KCl as the diluent.

The diluted homogenate is centrifuged at 78,000×g for 30 minutes. After centrifuging the supernatant or microsomal fraction is removed from the sediment layer by careful decantation and placed in glass vials. The creamy froth observed at the top of the centrifuge tube may or may not be included in the supernatant.

Polyethylene stoppered vials of the semi-purified O-methyl transferase enzyme may be stored at about −15° to −20° C. for up to 8 months as the active enzyme.

*Example III*

The O-methyl transferase enzyme, prepared according to Example II, is used in the following assay which is based upon the spectrophotofluorometric determination of the conversion of an epinephrine substrate to its methylated form, metanephrine or 3-O-methyl epinephrine, in the presence of the OMT enzyme, an excess of adenosylmethionine and magnesium ions (at 37° C. and pH 7.8).

Control tubes for the OMT in vitro assay are prepared as follows:

|  | Ml. |
|---|---|
| $MgCl_2$ (10 µmoles) | 0.1 |
| Adenosylmethionine (0.1 µmole) | 0.1 |
| 0.5 M phosphate buffer, pH 7.8 [1] (50 µmoles) | 0.2 |
| Deionized or T.D. water | 0.2 |
| Semi-purified OMT enzyme (approximately 23 mg. protein/ml.) | 0.2 |
| L-epinephrine-d-bitartrate in 0.01 N HCl (0.3 µmole) | 0.2 |
| Total volume | 1.0 |

[1] The optimum pH for the OMT is pH 7.5–8.2 in 0.1 M phosphate buffer (final buffer concentration).

For preliminary evaluation of a compound, 25 mg. of the compound to be tested for OMT inhibition is diluted to 100 ml. with deionized or triple distilled water, giving a concentration of potential inhibitor of approximately $1 \times 10^{-3}$ M.

Reaction tubes are prepared in the same manner as the control tubes except 0.1 ml. of inhibitor solution (concentration $1 \times 10^{-3}$ M) is added to each tube replacing some of the water.

The final concentration of inhibitor in the enzyme reaction mixtures is about $1 \times 10^{-4}$ M for assay purposes.

Blank tubes are prepared in the same manner as the control tubes but the coenzyme adenosylmethionine is omitted. The volume is made up to 1.0 ml. with deionized or triple distilled water.

To bring about the conversion of epinephrine to metanephrine the enzyme samples are incubated in 40–50 ml. glass-stoppered centrifuge tubes at 37° C. for 30 minutes at pH 7.8. After 30 minutes 0.5 ml. of borate buffer, 0.5 M and pH 10.0, is added to arrest the OMT enzyme action and to make possible the extraction and measurement of the accumulated metanephrine with selected solvent systems.

The 1.0 ml. reaction mixture plus 0.5 ml. of borate buffer is immediately extracted with 30 ml. of 3:2 toluene/isoamyl alcohol solvent (spectrophotometric grade). After shaking the tubes vigorously up and down 12 times, each sample is centrifuged 10 minutes at 2,000 r.p.m. Twenty-five ml. of the solvent layer (upper layer) is then removed from each tube to a second tube containing 1.5 ml. of 0.1 N HCl. The mixing is done as before and the samples centrifuged. From 1.0 to 1.3 ml. of the lower acid layer containing metanephrine formed during the OMT enzyme reaction are removed by careful pipetting. (The acid layer must be free of drops of solvent or the assay results could be erroneous because of solvent fluorescence.) At least 1.0 ml. of the acid layer is needed for the final metanephrine determination in an Aminco-Bowman Spectrophotofluorometer when the 1.0 ml. fused quartz cell is used.

The metanephrine in the 0.1 N HCl is measured fluorometrically with the activation wave length at 280 mµ and the fluorescent wavelength at 328 mµ. The sensitivity knob is set at 25 or 35 with the slit openings arranged as follows: ⅛″, ¹⁄₁₆″ and ⅛″. The usual meter multiplier settings used for the control samples are 0.1 and 0.3. The blanks are read at a meter multiplier setting of 0.01 and 0.03.

The final sample reading or percent transmission for each sample is determined by multiplying the percent transmission read from the meter dial by the meter multiplier settings used. Once the control and inhibitor sample readings are corrected for the blank (av. reading of 2 samples), the percent of enzyme activity is calculated by dividing the average of the blank corrected control reading (av. of 2 samples) into the blank corrected inhibitor sample readings and multiplying by 100. The inverse of the percent of enzyme activity thus obtained gives the percent of enzyme inhibition caused by a given compound under the assay conditions.

While in the foregoing detailed descriptions various embodiments of the invention have been given in detail, no unnecessary limitation should be understood therefrom as it will be appreciated by those skilled in the art that this invention is susceptible to variation without departing from the spirit and scope thereof.

We claim:

1. The process of controlling depression in warm-blooded animals so afflicted which comprises administering a therapeutic dose of monoamine oxidase inhibitor in conjunction with an O-methyl transferase inhibitor in a non-toxic amount sufficient to increase and prolong the effect of said monoamine oxidase inhibitor.

2. In the process of controlling depression in warm-blooded animals so afflicted the improvement which comprises administering a therapeutic dose of monoamine oxidase inhibitor in conjunction with an O-methyl transferase inhibitor.

3. The process for controlling depression in warm-blooded animals so afflicted which comprises administering a therapeutic dose of monoamine oxidase inhibitor in conjunction with 10 to 500 mg. of quinacrine/kg. of body weight.

4. The process for controlling depression in warm-blooded animals so afflicted which comprises administering up to 500 mg. of quinacrine/kg. in conjunction with a compound having the general formula:

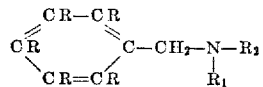

wherein R is selected from the group consisting of hydrogen, chlorine, bromine and fluorine; $R_1$ is selected from the group consisting of hydrogen, methyl and ethoxycarbonyl; $R_2$ is selected from the group consisting of propargyl and cyclopropyl; provided that when any R represents two halogen atoms are present on the phenyl group.

5. The process for controlling depression in warm-blooded animals so afflicted which comprises orally administering 25 to 500 mg. of quinacrine in conjunction with 1 to 200 mg. of a compound selected from the group consisting of N-methyl-N-benzylpropargylamine and non-toxic pharmaceutically acceptable salts thereof.

6. A composition of matter essentially consisting of 10 to 500 mg. of quinacrine, 1 to 200 mg. of a compound selected from the class consisting of N-methyl-N-benzylpropargylamine and a suitable non-toxic pharmaceutical carrier.

7. A composition of matter essentially consisting of 5 to 500 mg. of monoamine oxidase inhibitor, 1 to 200 mg. of O-methyl transferase inhibitor and a suitable non-toxic pharmaceutical carrier.

References Cited in the file of this patent

Axelrod: Chem. Abst., vol. 53, page 4179c, 1959.
Axelrod: Chem. Abst., vol. 53, page 2311h, 1959.
Drug Trade News, Mfg. Sect., March 6, 1961, page 63.

UNITED STATES PATENT OFFICE
CERTIFICATE OF CORRECTION

Patent No. 3,098,010 July 16, 1963

Guy M. Everett et al.

It is hereby certified that error appears in the above numbered patent requiring correction and that the said Letters Patent should read as corrected below.

Column 6, line 13, before "two" insert -- halogen, --.

Signed and sealed this 7th day of January 1964.

(SEAL)
Attest:
ERNEST W. SWIDER

Attesting Officer

EDWIN L. REYNOLDS

Acting Commissioner of Patents